(12) United States Patent
Wang et al.

(10) Patent No.: US 10,895,944 B2
(45) Date of Patent: Jan. 19, 2021

(54) TOUCH CONTROL STRUCTURE AND MANUFACTURING METHOD THEREOF, AND DISPLAY DEVICE

(71) Applicants: Hefei Xinsheng Optoelectronics Technology Co., Ltd., Hefei (CN); BOE Technology Group Co., Ltd., Beijing (CN)

(72) Inventors: Jing Wang, Beijing (CN); Lei Zhang, Beijing (CN); Zouming Xu, Beijing (CN); Guiyu Zhang, Beijing (CN); Qitao Zheng, Beijing (CN); Lingyan Wu, Beijing (CN); Qicheng Chen, Beijing (CN); Dong Li, Beijing (CN); Tsung Chieh Kuo, Beijing (CN); Xiaodong Xie, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/339,480

(22) PCT Filed: May 17, 2018

(86) PCT No.: PCT/CN2018/087288
§ 371 (c)(1),
(2) Date: Apr. 4, 2019

(87) PCT Pub. No.: WO2019/033804
PCT Pub. Date: Feb. 21, 2019

(65) Prior Publication Data
US 2019/0235702 A1    Aug. 1, 2019

(30) Foreign Application Priority Data
Aug. 15, 2017    (CN) .......................... 2017 1 0698883

(51) Int. Cl.
*G06F 3/044* (2006.01)
*G06F 3/041* (2006.01)
*H01L 41/332* (2013.01)

(52) U.S. Cl.
CPC .......... *G06F 3/0445* (2019.05); *G06F 3/0412* (2013.01); *G06F 3/0443* (2019.05);
(Continued)

(58) Field of Classification Search
None
See application file for complete search history.

(56) References Cited

U.S. PATENT DOCUMENTS 10,120,229 B2 * 11/2018 Chai ................. G02F 1/13338
2009/0236151 A1    9/2009 Yeh et al.
(Continued)

FOREIGN PATENT DOCUMENTS

| CN | 101639580 A | 2/2010 |
| CN | 102096532 A | 6/2011 |

(Continued)

OTHER PUBLICATIONS

Dec. 4, 2019—(CN) First Office Action Appn 201710698883.1 with English Translation.
(Continued)

*Primary Examiner* — Shamim Ahmed
(74) *Attorney, Agent, or Firm* — Banner & Witcoff, Ltd.

(57) ABSTRACT

A touch control structure and a manufacturing method thereof, and a display device. The manufacturing method of the touch control structure includes providing a thin film substrate; providing a base substrate, and affixing the thin film substrate on the base substrate; forming a laminate structure on the thin film substrate for implementation of
(Continued)

touch control functions; removing the thin film substrate with the laminate structure formed on top thereof from the base substrate.

9 Claims, 8 Drawing Sheets

(52) U.S. Cl.
CPC ........ *G06F 3/0446* (2019.05); *G06F 3/04164* (2019.05); *G06F 2203/04102* (2013.01); *G06F 2203/04103* (2013.01); *G06F 2203/04111* (2013.01)

(56) References Cited

U.S. PATENT DOCUMENTS

| | | | | |
|---|---|---|---|---|
| 2010/0026661 | A1* | 2/2010 | Teramoto | G06F 3/044 345/174 |
| 2013/0181921 | A1* | 7/2013 | Kuwajima | G06F 3/041 345/173 |
| 2014/0013566 | A1* | 1/2014 | Murray | G06F 3/044 29/407.09 |
| 2014/0055689 | A1* | 2/2014 | Lu | G02F 1/13338 349/12 |
| 2015/0220183 | A1* | 8/2015 | Youngs | G06F 3/044 345/173 |
| 2019/0121490 | A1 | 4/2019 | Teramoto | |
| 2019/0235702 | A1 | 8/2019 | Wang et al. | |

FOREIGN PATENT DOCUMENTS

| | | |
|---|---|---|
| CN | 102819367 A | 12/2012 |
| CN | 104063107 A | 9/2014 |
| CN | 109407869 A | 3/2019 |

OTHER PUBLICATIONS

Jul. 27, 2018—(WO) International Search Report and the Written Opinion Appn PCT/CN2018/087288 with English Translation.

* cited by examiner

TOUCH CONTROL STRUCTURE AND MANUFACTURING METHOD THEREOF, AND DISPLAY DEVICE

The application is a U.S. National Phase Entry of International Application No. PCT/CN2018/087288 filed on May 17, 2018, designating the United States of America and claiming priority to Chinese Patent Application No. 201710698883.1, filed on Aug. 15, 2017. The present application claims priority to and the benefit of the above-identified applications and the above-identified applications are incorporated by reference herein in their entirety.

TECHNICAL FIELD

Embodiments of the present disclosure relate to a touch control structure, a display device, and a method for manufacturing a touch control structure.

BACKGROUND

In recent years, the development of flexible display technology has developed rapidly, providing manufacturers with a lot of innovation space. When a flexible display product is applied to a high-level mobile phone or a new-generation wearable display device, the flexible display product is required to have a touch control function at the same time. At present, in a manufacturing process for a touch control structure of the flexible display product, roll-to-roll process is the mainstream process, and functional layers for signal transmission are respectively disposed on both sides of a film base, which makes the functional layers to be subjected to different stresses while they are bent, so products manufactured by the roll-to-roll process are prone to be broken in response to a small radius of curvature and may not meet the design requirements of products having small curvature or to be folded.

SUMMARY

At least one embodiment of the present disclosure provides a method for manufacturing a touch control structure, comprising: providing a film base; providing a base substrate, and attaching the film base to the base substrate; forming a laminated structure on the film base, the laminated structure being configured for implementing a touch control function; and removing the film base on which the laminate structure is formed from the base substrate.

For example, the method provided by an embodiment of the present disclosure further comprises: before attaching the film base to the base substrate, forming a first conductive layer on the film base to cover the film base; and after attaching the film base to the base substrate, forming an alignment mark on the first conductive layer, the alignment mark being configured for implementing an alignment function.

For example, the method provided by an embodiment of the present disclosure further comprises: after attaching the film base to the base substrate, forming a first conductive layer on the film base to cover the film base; and forming an alignment mark on the first conductive layer, the alignment mark being configured for implementing an alignment function.

For example, in the method provided by an embodiment of the present disclosure, the touch control structure has a touch region and a non-touch region, and forming the laminated structure comprises: performing a patterning process on the first conductive layer to form a plurality of electrode patterns, wherein the plurality of electrode patterns comprises a plurality of first touch electrodes disposed in the touch region, a plurality of second touch electrodes disposed in the touch region, and a plurality of first conductive traces disposed in the non-touch region, and each of the first touch electrodes comprises a plurality of first sub-electrodes; and forming a plurality of metal traces on the plurality of first conductive traces, wherein each of the plurality of metal traces comprises an overlap electrode adjacent to an edge of the touch region, and the plurality of first touch electrodes and the plurality of second touch electrodes are correspondingly connected with the plurality of metal traces through a plurality of the overlap electrodes.

For example, in the method provided by an embodiment of the present disclosure, forming the laminated structure further comprises: forming a first insulating layer on the film base; wherein the first insulating layer covers the plurality of first touch electrodes and the plurality of second touch electrodes, and vias are formed in the first insulating layer to expose the plurality of first sub-electrodes.

For example, in the method provided by an embodiment of the present disclosure, forming the laminated structure further comprises: forming a second conductive layer on the film base by using a patterning process; wherein the second conductive layer comprises a plurality of bridge electrodes disposed in the touch region and a plurality of second conductive traces disposed in the non-touch region, each of the bridge electrodes covers two of the vias, two adjacent first sub-electrodes are connected with each other by one of the bridge electrodes, and the plurality of second conductive traces are formed on the plurality of metal traces and cover the plurality of metal traces.

For example, in the method provided by an embodiment of the present disclosure, forming the laminated structure further comprises: forming a second insulating layer on the film base on which the second conductive layer is formed; wherein the second insulating layer covers an entire touch region of the film base.

For example, in the method provided by an embodiment of the present disclosure, the first insulating layer further covers other portion of each of the plurality of metal traces except a portion of each of the plurality of metal traces in a bonding region.

For example, in the method provided by an embodiment of the present disclosure, forming the laminated structure further comprises: forming a second conductive layer on the film base by using a patterning process; wherein the second conductive layer comprises a plurality of bridge electrodes disposed in the touch region and a plurality of bonding electrodes disposed in the non-touch region, each of the bridge electrodes covers two of the vias, two adjacent first sub-electrodes are connected with each other by one of the bridge electrodes, and the plurality of bonding electrodes cover a portion of each of the plurality of metal traces located in the bonding region.

For example, in the method provided by an embodiment of the present disclosure, forming the laminated structure further comprises: forming a second insulating layer on the film base on which the second conductive layer is formed; wherein the second insulating layer covers other regions of the film base except the bonding region.

At least one embodiment of the present disclosure provides a touch control structure having a touch region and a non-touch region, comprising: a film base; a first conductive layer on the film base, the first conductive layer comprising a plurality of first touch electrodes disposed in the touch region, a plurality of second touch electrodes disposed in the touch region, and a plurality of first conductive traces disposed in the non-touch region, and each of the first touch electrodes comprising a plurality of first sub-electrodes; an alignment mark on the first conductive layer, the alignment mark being configured for implementing an alignment function; and a plurality of metal traces on the plurality of first conductive traces, wherein each of the plurality of metal traces comprises an overlap electrode adjacent to an edge of the touch region, and the plurality of first touch electrodes and the plurality of second touch electrodes are correspondingly connected with the plurality of metal traces through a plurality of the overlap electrodes.

For example, the touch control structure provided by an embodiment of the present disclosure further comprises: a first insulating layer covering both the plurality of first touch electrodes and the plurality of second touch electrodes; wherein the first insulating layer has a plurality of vias exposing the plurality of first sub-electrodes.

For example, the touch control structure provided by an embodiment of the present disclosure further comprises: a second conductive layer on the film base; wherein the second conductive layer comprises a plurality of bridge electrodes disposed in the touch region and a plurality of second conductive traces on the plurality of metal traces, and the plurality of second conductive traces are configured for covering the plurality of metal traces, each of the bridge electrodes covers two of the vias, and two adjacent first sub-electrodes are electrically connected by one of the bridge electrodes.

For example, the touch control structure provided by an embodiment of the present disclosure further comprises: a second insulating layer on the second conductive layer; wherein the second insulating layer covers an entire touch region of the film base.

For example, in the touch control structure provided by an embodiment of the present disclosure, the first insulating layer further covers other portion of each of the plurality of metal traces except a portion of each of the plurality of metal traces in a bonding region.

For example, the touch control structure provided by an embodiment of the present disclosure further comprises: a second conductive layer on the film base; wherein the second conductive layer comprises a plurality of bridge electrodes disposed in the touch region and a plurality of bonding electrodes covering a portion of each of the plurality of metal traces located in the bonding region, each of the bridge electrodes covers two of the vias, and two adjacent first sub-electrodes are connected with each other by one of the bridge electrodes.

For example, the touch control structure provided by an embodiment of the present disclosure further comprises: a second insulating layer on the second conductive layer; wherein the second insulating layer covers other regions of the film base except the bonding region.

For example, in the touch control structure provided by an embodiment of the present disclosure, the film base comprises a cyclic olefin polymer film or a polyimide film.

For example, in the touch control structure provided by an embodiment of the present disclosure, a material of the first conductive layer comprises at least one selected from the group consisting of indium-tin oxide, tin oxide, and indium-zinc oxide.

For example, in the touch control structure provided by an embodiment of the present disclosure, a material of the second conductive layer comprises at least one selected from the group consisting of indium-tin oxide, tin oxide, and indium-zinc oxide.

At least one embodiment of the present disclosure provides a display device, comprising the touch control structure according to any one embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMBER

Figure 1:
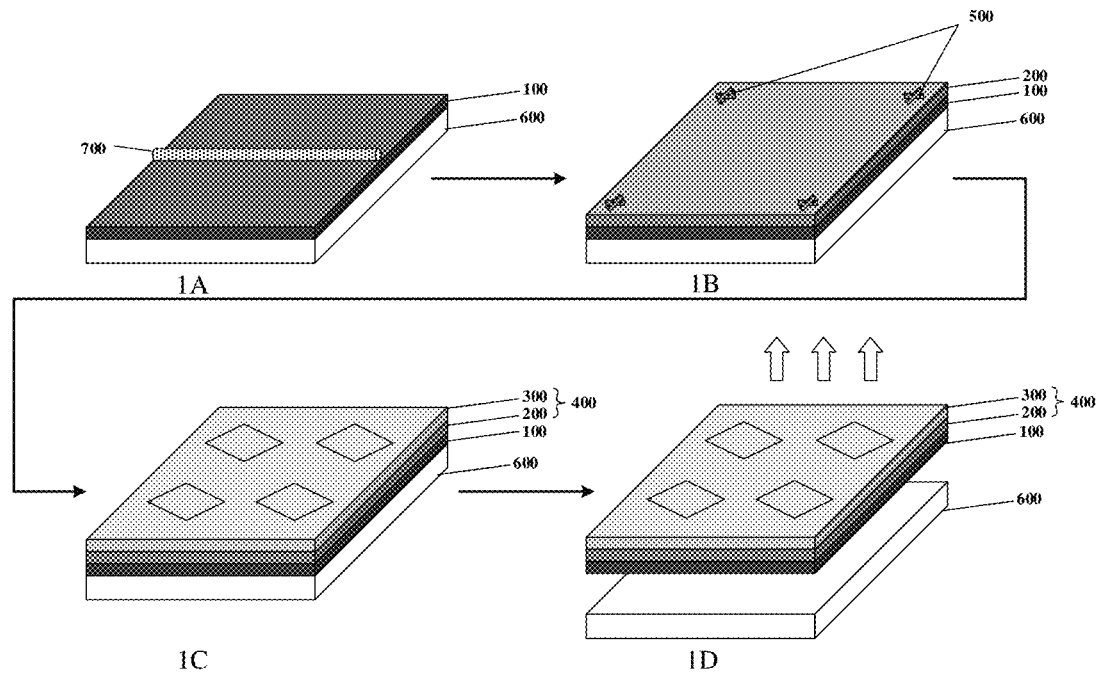
FIG. 1 is a schematic diagram of a method for manufacturing a touch control structure provided by an example of an embodiment of the present disclosure.

10—touch control structure; 100—film base; 200—first conductive layer; 300—other laminated structure; 400—laminated structure; 500—alignment mark; 600—base substrate; 101—touch region; 102—non-touch region; 210—first touch electrode; 211—first sub-electrode; 220—second touch electrode; 230—first conductive trace; 310—metal trace; 315—overlap electrode; 410—first insulating layer; 420—second insulating layer; 411—via; 511—bridge electrode; 512—second conductive trace; 515—bonding electrode; 700—roller

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At least one embodiment of the present disclosure provides a method for manufacturing a touch control structure, and the method includes: providing a film base; providing a base substrate, and attaching the film base to the base substrate; forming a laminated structure on the film base, the laminated structure being configured for implementing a touch control function; and removing the film base on which the laminate structure is formed from the base substrate. At least one embodiment of the present disclosure further provides a touch control structure corresponding to the above-mentioned method for manufacturing a touch control structure and a display device corresponding to the above-mentioned method for manufacturing a touch control structure.

The method for manufacturing the touch control structure can make functional layers of the touch control structure be disposed on the same side of the film base, and the functional layers are subjected to the same stress when being bent, thereby reducing a risk of fracture, and the method can further increase alignment accuracy.

In embodiments of the present disclosure, a patterning process may be a photolithography patterning process, which includes, for example, coating photoresist on a structural layer that needs to be patterned, the photoresist may be coated by spin coating, knife coating or roller coating; then exposing the photoresist layer by using a mask, and developing the exposed photoresist layer to obtain a photoresist pattern; then etching the structural layer using the photoresist pattern to form a desired pattern structure; finally, the photoresist pattern is optionally removed.

The embodiments and examples of the present disclosure are described in detail in the following with reference to the accompany drawings.

Figure 3A:
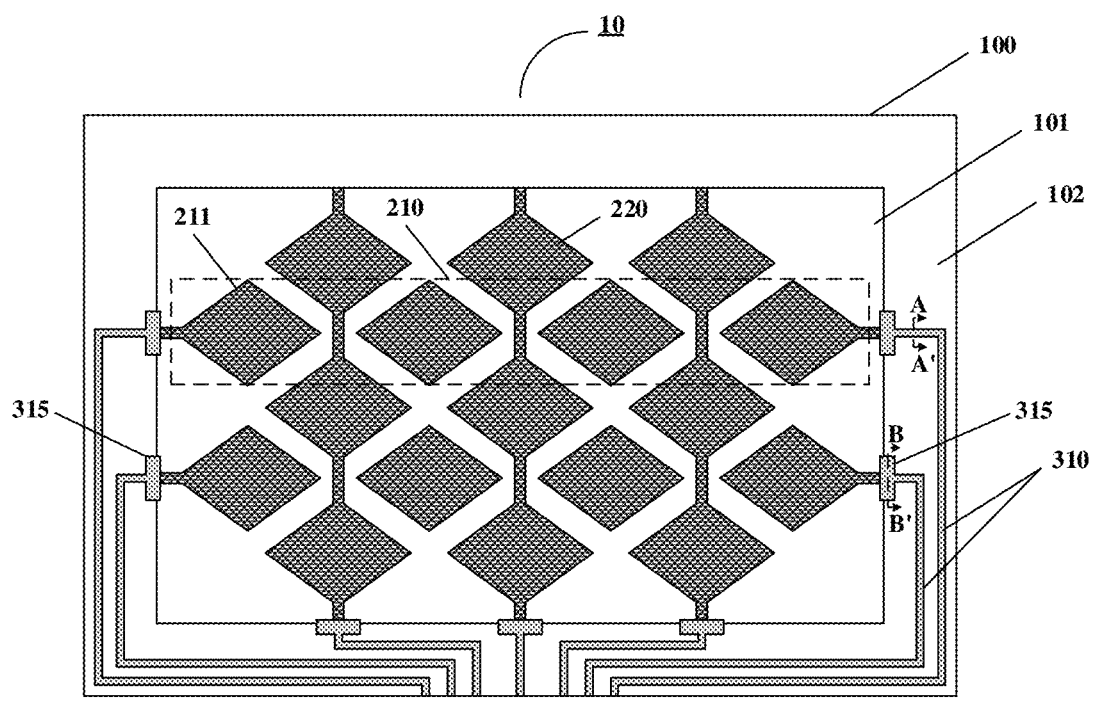
FIG. 3A is a schematic diagram of step S301 and step S302 in forming a laminated structure provided by an example of an embodiment of the present disclosure.

An embodiment of the present disclosure provides a touch control structure, as illustrated in FIG. 3A, the touch control structure 10 may have a touch region 101 and a non-touch region 102 (for example, a peripheral region). For example, the touch region 101 is a region in which touch electrodes are disposed, and the non-touch region 102 is a region in which traces (for example, metal traces) connected with the touch electrodes are disposed.

Figure 2:
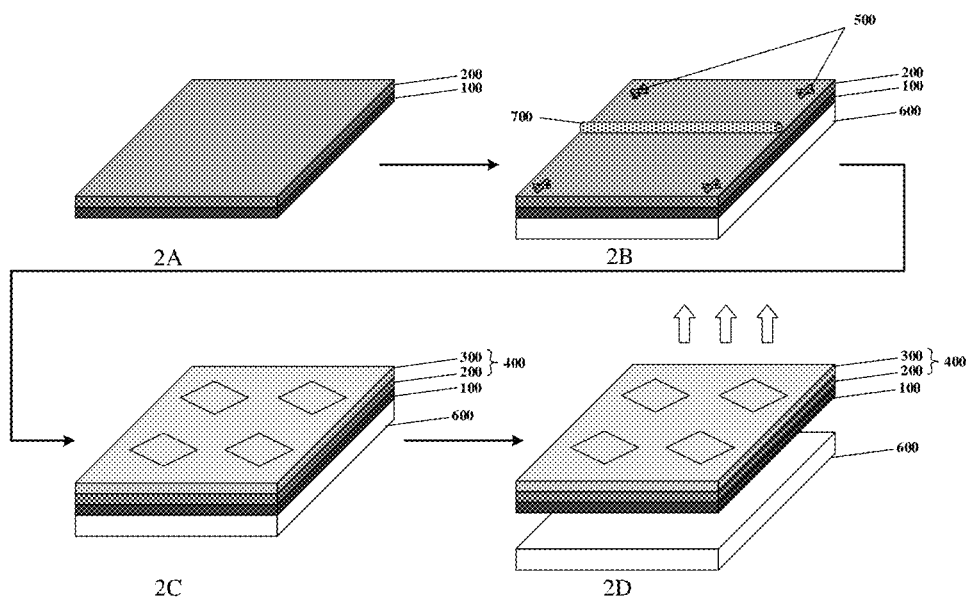
FIG. 2 is a schematic diagram of a method for manufacturing a touch control structure provided by another example of an embodiment of the present disclosure.

For example, as illustrated in FIG. 1 and FIG. 2, the touch control structure 10 includes: a film base 100; a first conductive layer 200 on the film base 100; and one or a plurality of alignment marks 500 on the first conductive layer 200, and the one or plurality of alignment marks 500 are configured for implementing an alignment function.

For example, the film base 100 employs a film material having a high light transmittance, particularly a film material having flexibility and a high light transmittance. For example, the film base 100 may be a cyclic olefin polymer (COP) film, a polyimide (PI) film or the like. For another example, when the touch control structure is used for a flexible product, the film base may be a polyimide film having a good tensile strength.

For example, the alignment marks 500 may be disposed at four corners on the periphery of the first conductive layer, the alignment marks 500 are used for alignment with other processes, such as alignment for an exposure process, and the alignment marks 500 can increase alignment accuracy. It should be noted that, the alignment marks 500 are only used for alignment in the process of manufacturing the touch control structure. After the touch control structure is manufactured, the portion where the alignment marks 500 are located can be cut off, that is, the final product may not include the alignment marks 500. In addition, the shape of the alignment mark 500 as illustrated in FIG. 1 and FIG. 2 is a cross-line type, which is not limited in the present disclosure. For example, the shape of the alignment mark 500 can be other shapes such as a rectangle, a circle, or the like.

For example, an intermediate layer such as an Index-Matching Layer (IML) may be disposed between the film base and the first conductive layer, and the refractive index of the IML is similar to the refractive index of the first conductive layer, thereby achieving an effect of the shadow reduction.

Figure 3B:
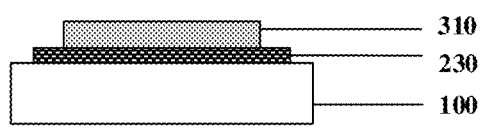
FIG. 3B is a section schematic diagram taken along line A-A' of FIG. 3A.
Figure 3C:
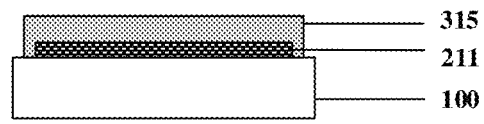
FIG. 3C is a section schematic diagram taken along line B-B' of FIG. 3A.

For example, as illustrated in FIG. 3A, FIG. 3B and FIG. 3C (FIG. 3B is a section schematic diagram taken along line A-A' of FIG. 3A, and FIG. 3C is a section schematic diagram taken along line B-B' of FIG. 3A), the first conductive layer includes a plurality of first touch electrodes 210 disposed in the touch region 101, a plurality of second touch electrodes 220 disposed in the touch region 101, and a plurality of first conductive traces 230 (not illustrated in FIG. 3A, see FIG. 3B) disposed in the non-touch region 102. Each of the first touch electrodes 210 includes a plurality of first sub-electrodes 211.

It should be noted that, for the purpose of clarity, only some of first touch electrodes 210 and some of second touch electrodes 220 are exemplarily illustrated in FIG. 3A, and those skilled in the art can understand that, in order to achieve a corresponding touch effect, the first touch electrodes and the second touch electrodes should be filled with the touch region 101 as much as possible while the first touch electrodes and the second touch electrodes being insulated from each other, and the following embodiments are the same in this aspect.

In addition, each of the first touch electrodes 210 in FIG. 3A is exemplarily illustrated to include only four first sub-electrodes 211. The embodiments of the present disclosure include but are not limited thereto, the number of the first sub-electrodes can be provided as needed, and the following embodiments are the same in this aspect.

It is easy to understand that, the first touch electrode may also be provided as a continuous electrode pattern, the second touch electrodes may be provided as several discontinuous electrode patterns, which is not limited in the present disclosure, and the following embodiments are the same in this aspect.

For example, as illustrated in FIG. 3A and FIG. 3B, the touch control structure 10 further includes a plurality of metal traces 310 on the plurality of first conductive traces 230. It should be noted that, the first conductive traces 230 cannot be seen from FIG. 3A due to the shielding of the metal traces 310, and a positional relationship between the metal traces 310 and the first conductive traces 230 may be referenced to FIG. 3B. In addition, a width of each of the metal traces 310 as illustrated in FIG. 3B is only schematic. For example, the width of each of the metal traces 310 may also be identical with a width of each of the first conductive traces 230, which is not limited by the embodiments of the present disclosure.

For example, a material of the metal traces 310 is selected from the group consisting of copper, copper alloy, aluminum, aluminum alloy, gold, gold alloy, silver, silver alloy and combination thereof, or the like. Providing the metal traces 310 and using a metal material with good ductility (such as copper or copper alloy) can effectively reduce a channel impedance and increase the ductility of the metal trace in the bent region, thereby ensuring the function of an edge bend region of the touch control structure.

For example, as illustrated in FIG. 3A and FIG. 3C, each of the metal traces 310 includes an overlap electrode 315 adjacent to an edge of the touch region 101, the plurality of first touch electrodes 210 (the first sub-electrode 211) are correspondingly connected with the plurality of metal traces 310 through a plurality of the overlap electrodes 315, and the plurality of second touch electrodes 220 are correspondingly connected with the plurality of metal traces 310 through a plurality of the overlap electrodes 315. For example, a portion of the first touch electrode 210 (the first sub-electrode 211) as well as a portion of the second touch electrode 220 at the edge of the touch region 101 extends toward the non-touch region 102 to facilitate better electrical connection with the overlap electrode 315. As can be seen from FIG. 3C, the overlap electrode 315 covers a portion of the first sub-electrode 211 that extends to the non-touch region 102.

The overlap electrodes 315 are provided to facilitate the electrical connection between the first touch electrode 210 and the metal trace 310 and the electrical connection between the second touch electrode 220 and the metal trace 310. It should be noted that, the overlap electrodes 315 as illustrated in FIG. 3A are only schematic, and the shape and size of each of the overlap electrodes in FIG. 3A do not represent real proportions. For example, a width of each of the overlap electrodes 315 may be greater than the width of the remaining portion of the metal trace 310; for another example, each of the overlap electrodes 315 may have a same wide as the remaining portion of the metal trace 310.

In the embodiments of the present disclosure, the first conductive trace 230 may serve as a buffer layer of the metal trace 310 formed thereon, such that the adhesion of the metal trace 310 to the film base 100 can be increased, thereby ensuring the function of the edge bend region of the touch control structure.

Figure 4A:
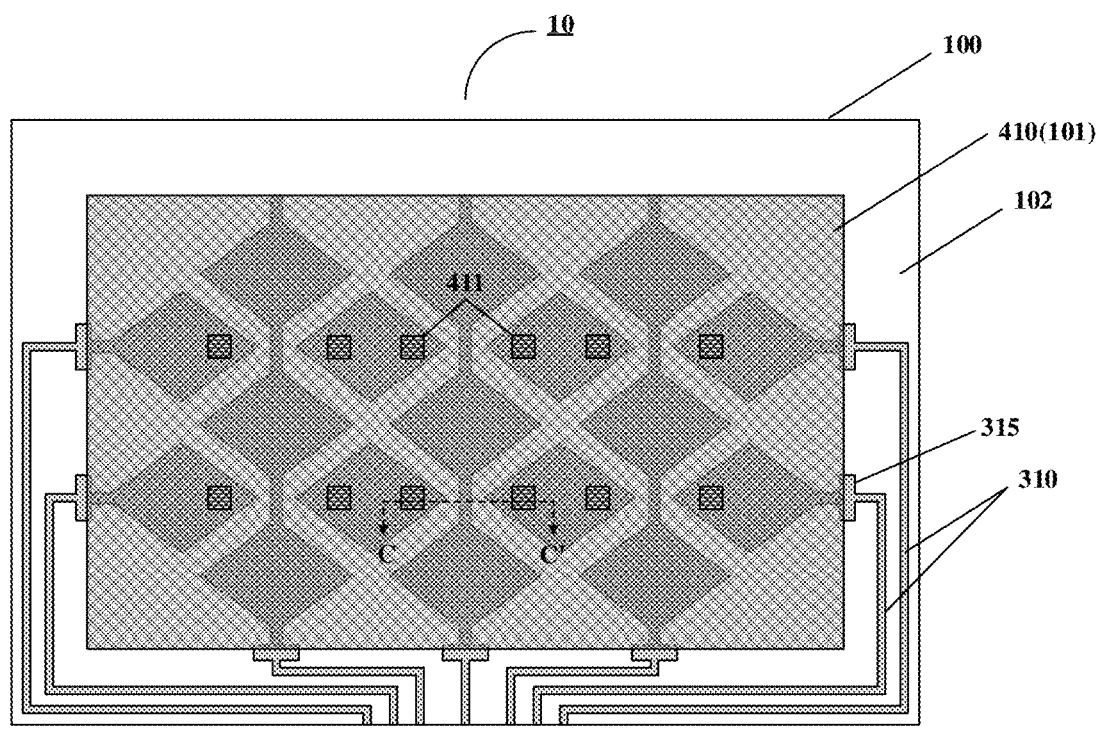
FIG. 4A is a schematic diagram of step S303 in forming a laminated structure provided by an example of an embodiment of the present disclosure.
Figure 4B:
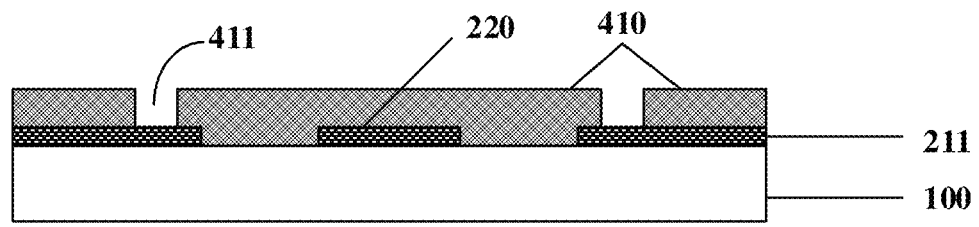
FIG. 4B is a section schematic diagram taken along line C-C' of FIG. 4A.

For example, as illustrated in FIG. 4A and FIG. 4B (FIG. 4B is a section schematic diagram taken along line C-C' of FIG. 4A), the touch control structure 10 further includes a first insulating layer 410 covering both the plurality of first touch electrodes 210 and the plurality of second touch electrodes 220, and the first insulating layer 410 has a plurality of vias 411 exposing the plurality of first sub-electrodes 211. For example, the first insulating layer 410 covers the entire touch region 101, and the first insulating layer 410 insulates the first touch electrode 210 from the second touch electrode 220 adjacent to the first touch electrode 210. The via 411 is arranged such that a subsequently formed bridge electrode may electrically connect two adjacent first sub-electrodes 211 to each other through the via 411.

Figure 5A:
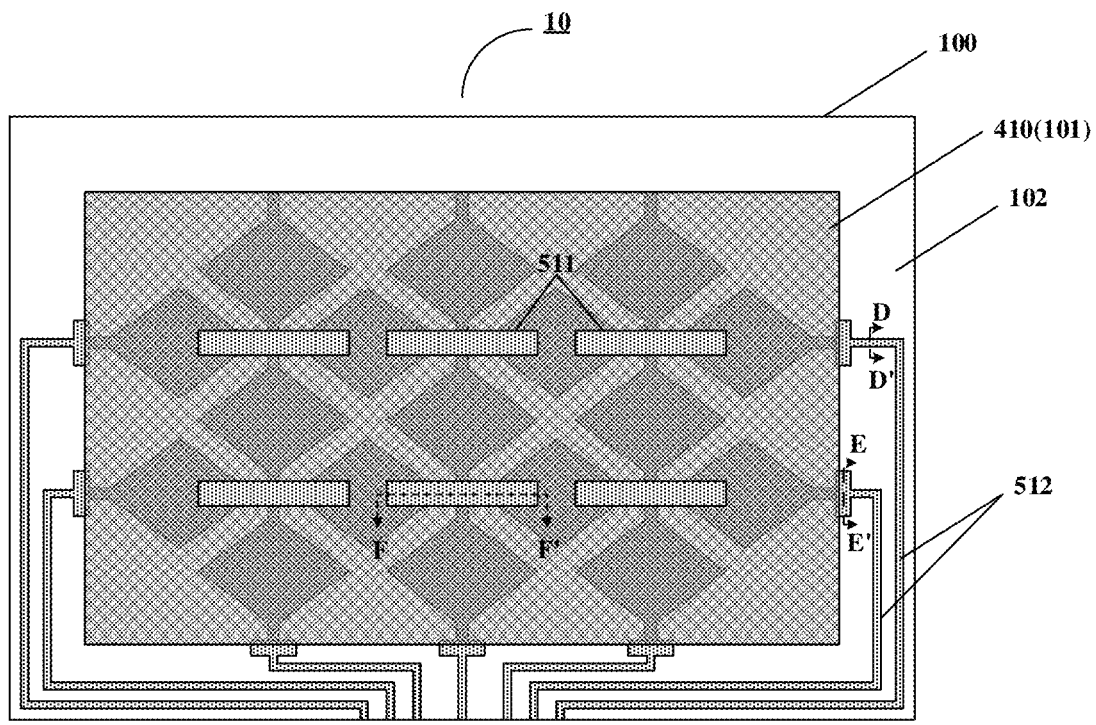
FIG. 5A is a schematic diagram of step S304 in forming a laminated structure provided by an example of an embodiment of the present disclosure.

For example, as illustrated in FIG. 5A, the touch control structure 10 further includes a second conductive layer on the film base 100. The second conductive layer includes a plurality of bridge electrodes 511 disposed in the touch region 101 and a plurality of second conductive traces 512 on the plurality of metal traces 310, and the plurality of second conductive traces 512 are configured for covering the plurality of metal traces 310.

Figure 5B:
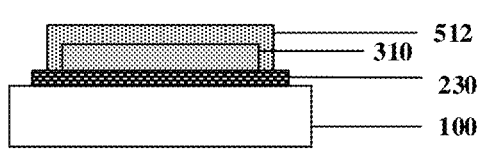
FIG. 5B is a section schematic diagram taken along line D-D' of FIG. 5A.
Figure 5C:
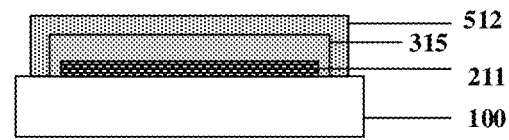
FIG. 5C is a section schematic diagram taken along line E-E' of FIG. 5A.
Figure 5D:
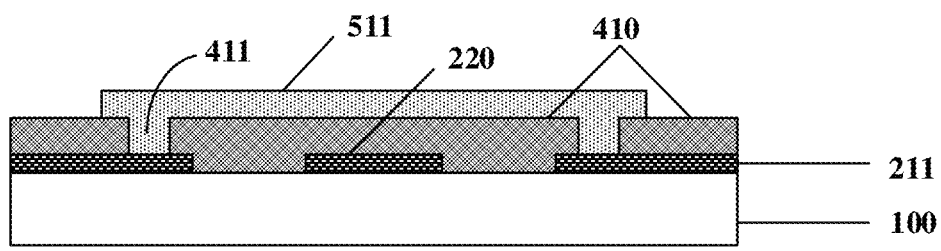
FIG. 5D is a section schematic diagram taken along line F-F' of FIG. 5A.

For example, as illustrated in FIG. 5D (FIG. 5D is a section schematic diagram taken along line F-F' of FIG. 5A), each of the bridge electrodes 511 covers two vias 411, the bridge electrode 511 is in direct contact with the first sub-electrodes 211 through the vias 411, and two adjacent first sub-electrodes 211 are electrically connected to each other by the bridge electrode 511.

For example, as illustrated in FIG. 5B and FIG. 5C (FIG. 5B is a section schematic diagram taken along line D-D' of FIG. 5A, and FIG. 5C is a section schematic diagram taken along line E-E' of FIG. 5A), the second conductive trace 512 covers the metal trace 310 (including the overlap electrode 315).

In the present embodiment, the second conductive trace 512 may be used as a protective layer of the metal trace 310 to prevent the metal trace 310 from being directly exposed to the air, thereby avoiding an oxidation problem of the metal trace 310.

Figure 6A:
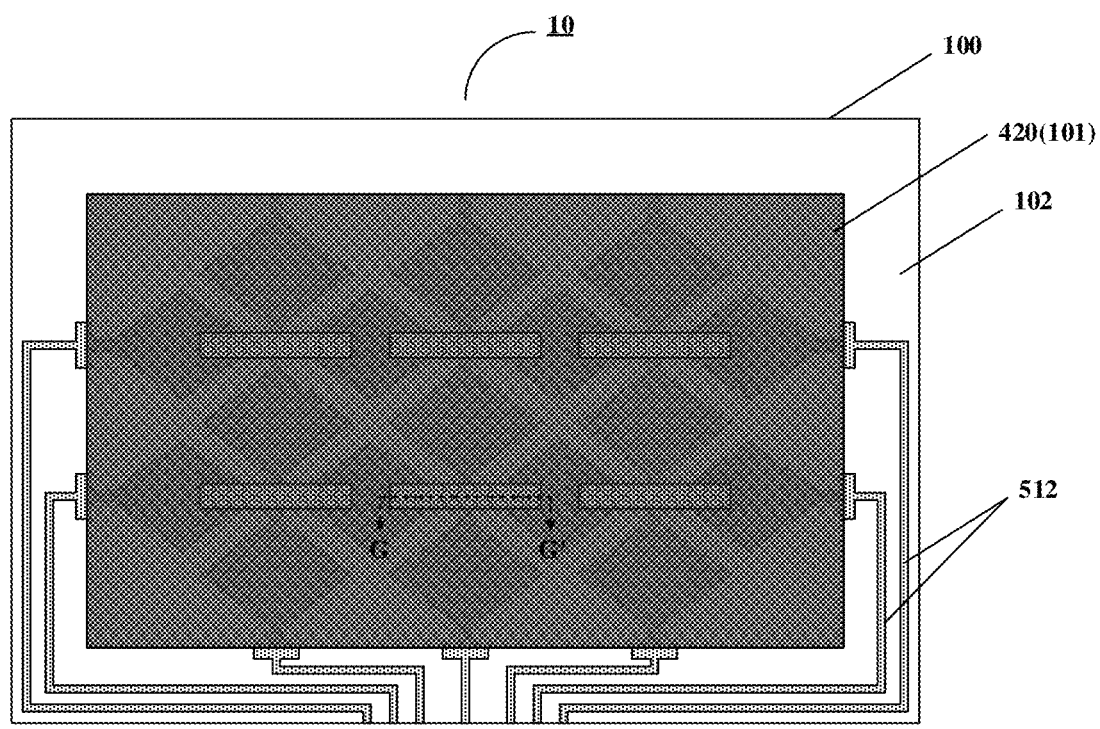
FIG. 6A is a schematic diagram of step S305 in forming a laminated structure provided by an example of an embodiment of the present disclosure.
Figure 6B:
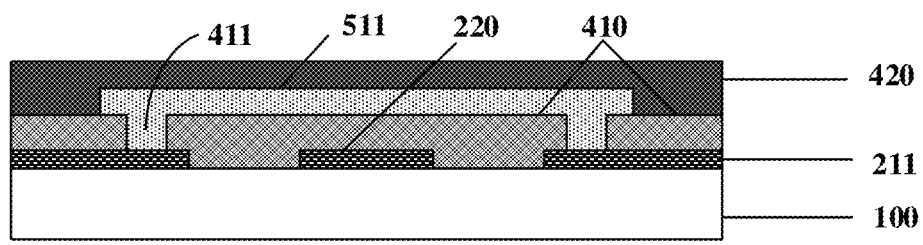
FIG. 6B is a section schematic diagram taken along line G-G' of FIG. 6A.

For example, as illustrated in FIG. 6A and FIG. 6B (FIG. 6B is a section schematic diagram taken along line G-G' of FIG. 6A), the touch control structure 10 may further include a second insulating layer 420 on the second conductive layer, and the second insulating layer 420 covers the entire touch region 101 of the film base 100. As illustrated in FIG. 6B, the second insulating layer 420 covers the bridge electrodes 511 and is used to protect the bridge electrodes 511.

Another embodiment of the present disclosure further provides a touch control structure. The difference between the present embodiment and the previous embodiment is that the arrangements of the first insulating layer, the second conductive layer, and the second insulating layer.

Figure 7A:
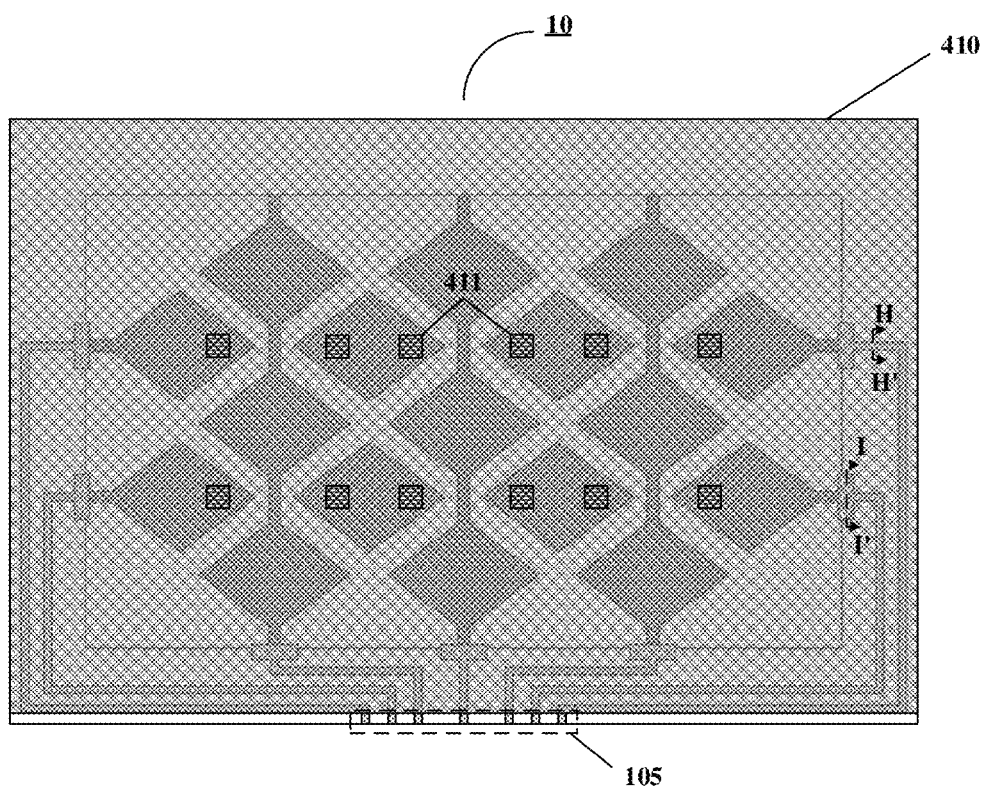
FIG. 7A is a schematic diagram of step S303' in forming a laminated structure provided by another example of an embodiment of the present disclosure.
Figure 7B:
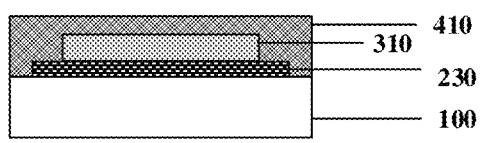
FIG. 7B is a section schematic diagram taken along line H-H' of FIG. 7A.
Figure 7C:
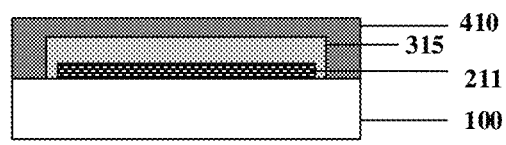
FIG. 7C is a section schematic diagram taken along line I-I' of FIG. 7A.

For example, as illustrated in FIG. 7A, FIG. 7B and FIG. 7C (FIG. 7B is a section schematic diagram taken along line H-H' of FIG. 7A, and FIG. 7C is a section schematic diagram taken along line I-I' of FIG. 7A), the touch control structure provided by the present embodiment is different from the previous embodiment (as illustrated in FIG. 4A) in that: the first insulating layer 410 further covers other portion of each metal trace 310, except for the portion of each metal trace 310 in a bonding region 105. For example, the first insulating layer 410 covers the touch region 101, and the first insulating layer 410 further covers other portions of the non-touch region 102 except for the bonding region 105. Because the metal traces 310 are to be electrically connected with other structures in the bonding region 105 (for example, the metal traces 310 are electrically connected with a touch detection chip), the first insulating layer 410 does not cover the metal traces 31 in the bonding region 105. The arrangement of the vias 411 in the first insulating layer 410 may be referenced to the corresponding description of FIG. 4A, and details are not described herein again.

In the present embodiment, the first insulating layer 410 may be used as a protective layer of the metal traces 310 (excluding the metal traces 310 in the bonding region 105), so as to prevent the metal traces 310 from being directly exposed to the air, thereby avoiding the oxidation problem of the metal traces 310.

Figure 8A:
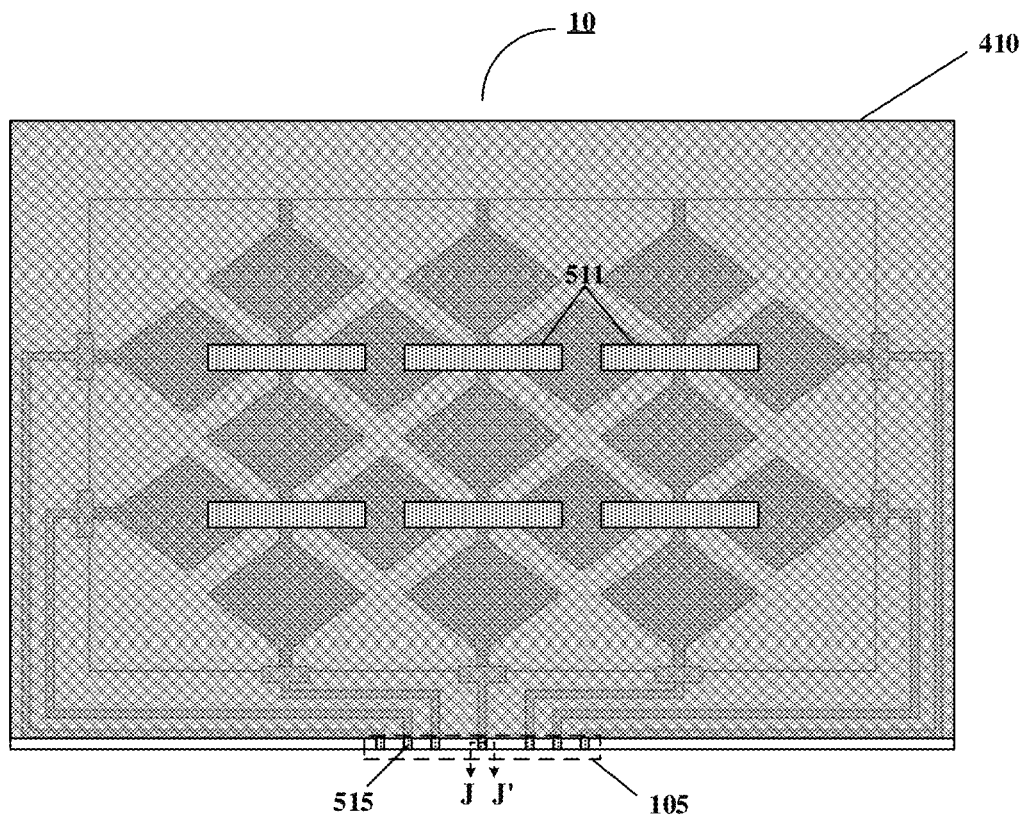
FIG. 8A is a schematic diagram of step S304' in forming a laminated structure provided by another example of an embodiment of the present disclosure.

For example, as illustrated in FIG. 8A, the touch control structure 10 provided in the present embodiment further includes a second conductive layer on the film base 100. The second conductive layer includes a plurality of bridge electrodes 511 disposed in the touch region 101. Each of the bridge electrodes 511 covers two vias, and two adjacent first sub-electrodes are connected with each other through the bridge electrode. The structure of the bridge electrodes is consistent with the previous embodiment and may be referenced to FIG. 5D, details are not described herein again.

Figure 8B:
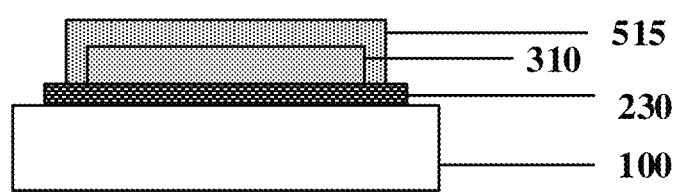
FIG. 8B is a section schematic diagram taken along line J-J' of FIG. 8A.

For example, as illustrated in FIG. 8A and FIG. 8B (FIG. 8B is a section schematic diagram taken along line J-J' of FIG. 8A), the second conductive layer further includes a plurality of bonding electrodes 515 each covering a portion of each of the plurality of metal traces 310 in the bonding region 105.

In the present embodiment, the bonding electrodes 515 covers the metal traces 310 located in the bonding region 105, which can prevent the portion of the metal traces 310 from being directly exposed to the air, thereby avoiding the oxidation problem of the metal traces 310.

Figure 9A:
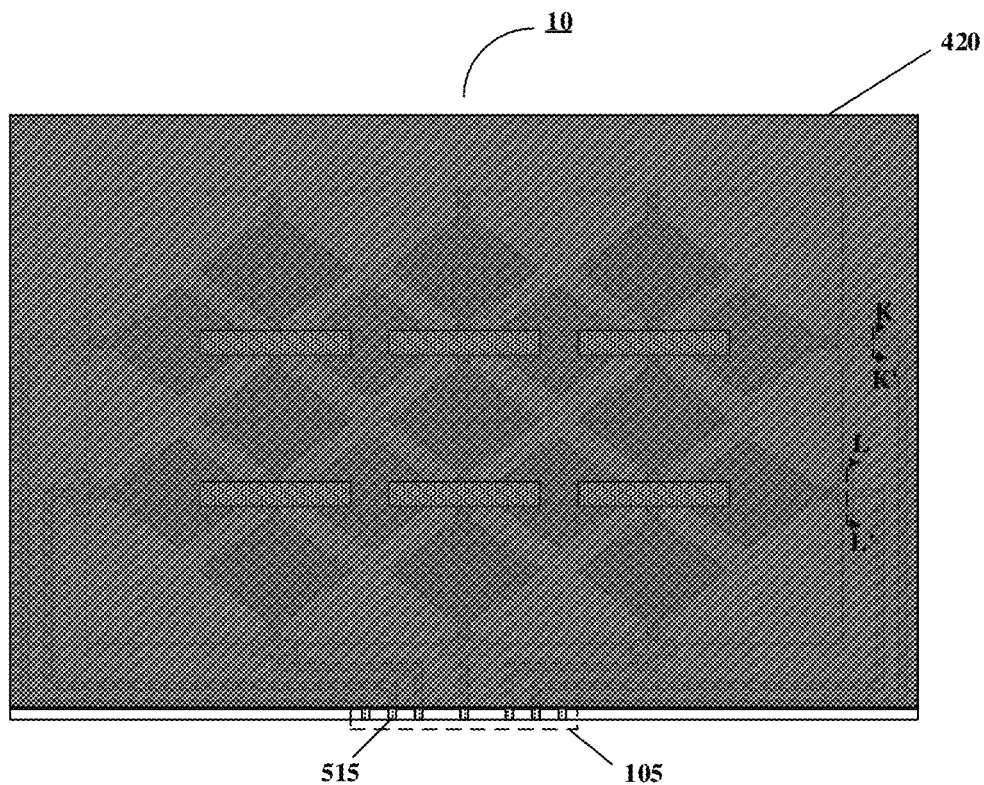
FIG. 9A is a schematic diagram of step S305' in forming a laminated structure provided by another example of an embodiment of the present disclosure.
Figure 9B:
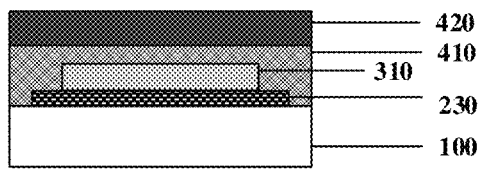
FIG. 9B is a section schematic diagram taken along line K-K' of FIG. 9A.
Figure 9C:
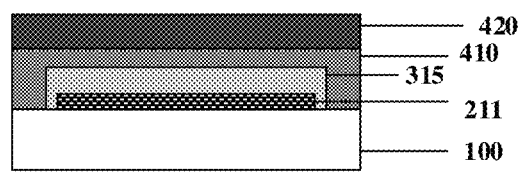
FIG. 9C is a section schematic diagram taken along line L-L' of FIG. 9A.

For example, as illustrated in FIG. 9A, FIG. 9B and FIG. 9C (FIG. 9B is a section schematic diagram taken along line K-K' of FIG. 9A, and FIG. 9C is a section schematic diagram taken along line L-L' of FIG. 9A), the touch control structure 10 provided by the present embodiment further includes a second insulating layer 420 on the second conductive layer, and the second insulating layer 420 covers other regions of the film base 100 except for the bonding region 105. For example, in the touch region 101, the second insulating layer 420 covers the bridge electrodes 511 so as to protect the bridge electrodes 511, the related description may be referenced to FIG. 6B, It should be noted that, because the metal traces 310 in the bonding region 105 are to be electrically connected with other structures (for example, the metal traces 310 are electrically connected with a touch detection chip), the second insulating layer 420 does not cover the metal traces 310 in the bonding region 105.

In the touch control structure provided by the embodiment of the present disclosure, the functional layer of the touch control structure, that is, the first conductive layer is disposed on the same side of the film base, and the first conductive layer is subjected to the same stress when being bent, thereby reducing a risk of fracture.

In the touch control structure provided by the embodiment of the present disclosure, the first conductive trace serves as a buffer layer of the metal trace formed thereon, and an adhesion of the metal trace can be increased, thereby ensuring the function of the edge bend region of the touch control structure.

In the touch control structure provided by the embodiment of the present disclosure, the second conductive trace or the first insulating layer serves as a protective layer of the metal trace to prevent the metal trace from being directly exposed to the air, thereby avoiding the oxidation problem of metal trace.

In the touch control structure provided by the embodiment of the present disclosure, the second insulating layer serves as a protective layer of the bridge electrodes to protect the bridge electrodes.

In the embodiments of the present disclosure, a material of the first conductive layer may be a transparent conductive material. For example, the material of the first conductive layer may be ITO (indium-tin oxide), $SnO_2$ (tin oxide), etc., and for another example, the material of the first conductive layer may also be IZO (indium-zinc oxide). The embodiments of the present disclosure include, but are not limited to, the examples, and the following embodiments are the same in this aspect.

Similarly, in the embodiments of the present disclosure, a material of the second conductive layer may be a transparent conductive material. For example, the material of the second conductive layer may be ITO (indium-tin oxide), $SnO_2$ (tin oxide), etc., and for another example, the material of the second conductive layer may also be IZO (indium-zinc oxide). The embodiments of the present disclosure include, but are not limited to, the examples, and the following embodiments are the same in this aspect.

The embodiments of the present disclosure further provide a display device including any one of the touch control structures provided by the embodiments of the present disclosure.

The display device provided by the embodiment of the present disclosure may further include a display screen. It should be noted that, the embodiments of the present disclosure do not limit the mode in which the touch control structure and the display screen being combined.

For example, the display screen includes an array substrate and an opposed substrate (for example, a color filter substrate) opposed to the array substrate.

For example, the touch control structure may be disposed on a protective cover, the protective cover is used to cover the display screen to protect the display screen, and a side of the protective cover formed with the touch control structure faces the display screen. That is, the touch control structure and the display screen are combined in an OGS (One Glass Solution) mode.

For another example, the touch control structure may be disposed at a side of the opposed substrate away from the array substrate, and a side of the touch control structure away from the opposed substrate may further be provided with a polarizer. That is, the touch control structure and the display screen are combined in an On-Cell (external) mode.

For another example, the touch control structure may also be disposed at a side of the opposed substrate facing the array substrate. That is, the touch control structure and the display screen are combined in an In-Cell (embedded) mode.

It should be noted that the display device in the embodiment of the present disclosure may be a liquid crystal panel, a liquid crystal television, a display, an OLED panel, an OLED television, an electronic paper, a mobile phone, a tablet computer, a laptop computer, a digital photo frame, a navigator and other products or components having display function.

The technical effects of the display device provided in the embodiment of the present disclosure may be referenced to the corresponding descriptions in the above-mentioned embodiments, and details are not described here again.

The embodiments of the present disclosure further provide a method for manufacturing a touch control structure. As illustrated in FIG. 1, the method includes the following operations.

Step S10: providing a film base 100;

Step S20: providing a base substrate 600, and attaching the film base 100 to the base substrate 600;

Step S30: forming a laminated structure 400 on the film base 100, the laminated structure 400 being configured for implementing a touch control function; and Step S40: removing the film base 100 on which the laminated structure 400 is formed from the base substrate 600.

In step S10 and step S20, for example, as illustrated by the numeral 1A in FIG. 1, providing the film base 100 and the base substrate 600, and attaching the film base 100 to the base substrate 600. For example, the film base 100 may be flat attached to the base substrate 600 by a film adhering process. For example, a roller 700 as illustrated in FIG. 1 may be used for adherence during the film adhering process. For example, the film base 100 may be adhered to the base substrate 600 by using an OCA (Optically Clear Adhesive).

For example, the film base 100 may be a cyclic olefin polymer (COP) film, and for another example, the film base 100 may also be a polyimide (PI) film. For example, the base substrate 600 may be a glass substrate. The present disclosure does not limit to this.

In step S30, for example, as illustrated by the numerals 1B and 1C in FIG. 1, an example of forming the laminated structure 400 includes the following operations.

Step S310: forming a first conductive layer 200 on the film base 100 to cover the film base 100;

Step S320: forming one or a plurality of alignment marks 500 on the first conductive layer 200, the one or plurality of alignment marks are configured for implementing an alignment function; and Step S330: forming other laminated structure 300 on the first conductive layer 200.

In step S310, for example, as illustrated by the numeral 1B in FIG. 1, a film of the first conductive layer 200 may be formed on the film base 100 by a sputtering process to completely cover the film base 100. The embodiment of the present disclosure does not limit the process of forming the first conductive layer. For example, a CVD (Chemical Vapor Deposition) process or a PVD (Physical Vapor Deposition) process or the like may be employed. The following embodiments are the same as those described herein and will not be described again.

In step S320, for example, as illustrated by the numeral 1B in FIG. 1, the alignment marks 500 may be disposed at four corners on the periphery of the first conductive layer for alignment with other processes, such as alignment for an exposure process, and the alignment marks 500 can increase alignment accuracy. For example, the alignment marks may be manufactured by processes of coating photoresist, exposure, development, and the like.

It should be noted that, the alignment marks 500 are only used for alignment in the process of manufacturing the touch control structure. After the touch control structure is manufactured, the portion where the alignment marks 500 are located may be cut off, that is, the final product may not include the alignment marks 500. In addition, the shape of the alignment mark 500 as illustrated by the numeral 1B in FIG. 1 is a cross-line type, which is not limited in the present disclosure. For example, the shape of the alignment mark 500 may be other shapes such as a rectangle, a circle, or the like.

In step S330, for example, as illustrated by the numeral 1C in FIG. 1, forming other laminated structure 300 on the first conductive layer 200. For example, the other laminated structure 300 includes metal traces, a first insulating layer, a second conductive layer, and a second insulating layer described below. It should be noted that, in the present embodiment, in order to more clearly describe the manufacturing method, laminated structure except the first conductive layer 200 in the laminated structure 400 is referred to as other laminated structure 300, and the laminated structure 400 is used for implementing the touch control function. That is, the laminated structure 400 includes the first conductive layer 200 and other laminated structures 300.

In step S40, for example, as illustrated by the numeral 1D in FIG. 1, removing the film base 100 on which the laminated structure 400 is formed from the base substrate 600. For example, the film base 100 on which the laminated structure 400 is formed may be removed from the base substrate 600 by a film peeling process.

The base substrate 600 (for example, a glass substrate) may be recycled after the above-described film adhering process and film peeling process, so loss can be reduced.

Another embodiment of the present disclosure further provides a method for manufacturing a touch control structure, as illustrated in FIG. 2, for example, the present embodiment differs from the embodiment as illustrated in FIG. 1 in that a first conductive layer 200 is first formed on the film base 100 to cover the film base 100 before attaching the film base 100 to the base substrate 600.

For example, as illustrated by the numeral 2A in FIG. 2, a film of the first conductive layer 200 may be formed on the film base 100 by a sputtering process to completely cover the film base 100.

For example, as illustrated by the numeral 2B in FIG. 2, the film base 100 on which the first conductive layer 200 is formed is attached to the base substrate 600. For example, the film base 100 may be flat attached to the base substrate 600 by the same film adhering process as those described in the previous embodiment. For example, the film base 100 may be adhered to the base substrate 600 by using an OCA (Optically Clear Adhesive).

The method provided in the present embodiment further includes the following operations: forming one or a plurality of alignment marks 500 on the first conductive layer 200 (as illustrated by the numeral 2B in FIG. 2), the one or plurality of alignment marks are configured for implementing an alignment function; forming other laminated structure 300 on the first conductive layer 200 (as illustrated by the numeral 2C in FIG. 2); and removing the film base 100 on which the laminated structure 400 is formed from the base substrate 600 (as illustrated by the numeral 2D in FIG. 2). These steps are the same as the corresponding descriptions in the previous embodiment, and details are not described herein again.

It should be noted that, an intermediate layer such as an Index-Matching Layer (IML) may be formed between the film base 100 and the first conductive layer 200, and the refractive index of the IML is similar to the refractive index of the first conductive layer, thereby achieving an effect of the shadow reduction.

In the method for manufacturing the touch control structure, the functional layer of the touch control structure, that is, the first conductive layer is disposed on the same side of the film base, and the first conductive layer is subjected to the same stress when being bent, thereby reducing a risk of fracture.

In addition, after the film base is attached to the surface of the base substrate, other processing operations are performed on the film base to form the touch control structure. In this way, the base substrate may be used to maintain a flatness of the surface of the film base, which can achieve high-precision processes, for example, a photolithography precision can be increased. The following operations describe the manufacturing steps of the laminated structure in the above-described method for manufacturing the touch control structure by two examples.

For example, in an example for forming the laminated structure, as illustrated in FIG. 3A, the touch control structure 10 has a touch region 101 and a non-touch region 102 (for example, a peripheral region). For example, the touch region 101 is a region in which touch electrodes are disposed, and the non-touch region 102 is a region in which metal traces connected with the touch electrode are disposed.

An example of forming the laminated structure may include the following operations.

Step S301: performing a patterning process on the first conductive layer to form a plurality of electrode patterns;

Step S302: forming a plurality of metal traces on the plurality of first conductive traces.

In step S301, for example, as illustrated in FIG. 3A, FIG. 3B and FIG. 3C (FIG. 3B is a section schematic diagram taken along line A-A' of FIG. 3A, and FIG. 3C is a section schematic diagram taken along line B-B' of FIG. 3A), the plurality of electrode patterns includes a plurality of first touch electrodes 210 disposed in the touch region 101, a plurality of second touch electrodes 220 disposed in the touch region 101, and a plurality of first conductive traces 230 (not illustrated in FIG. 3A) disposed in the non-touch region 102. Each of the first touch electrodes 210 includes a plurality of first sub-electrodes 211. The arrangements of the first touch electrodes, the second touch electrodes and the first sub-electrodes may be referenced to the corresponding description in the above embodiment regarding the laminated structure, and details are not described herein again.

For example, the patterning process may be a photolithography process including coating photoresist, exposure, development, etching, lift-off, and the like.

In step S302, for example, as illustrated in FIG. 3A and FIG. 3B, forming the plurality of metal traces 310 on the plurality of first conductive traces 230. For example, an example of forming the metal traces includes processes of sputtering a film, coating photoresist, exposure, development, etching, lift-off and the like.

It should be noted that, the first conductive traces 230 cannot be seen from FIG. 3A due to the shielding of the metal traces 310, and a positional relationship between the metal traces 310 and the first conductive traces 230 may be referenced to FIG. 3B. In addition, a width of each of the metal traces 310 as illustrated in FIG. 3B is only schematic. For example, the width of each of the metal traces 310 may also be identical with a width of each of the first conductive traces 230, which is not limited by the embodiments of the present disclosure.

For example, as illustrated in FIG. 3A and FIG. 3C, each of the metal traces 310 includes an overlap electrode 315 adjacent to an edge of the touch region 101, the plurality of first touch electrodes 210 (the first sub-electrode 211) are correspondingly connected with the plurality of metal traces 310 through a plurality of the overlap electrodes 315, and the plurality of second touch electrodes 220 are correspondingly connected with the plurality of metal traces 310 through a plurality of the overlap electrodes 315. For example, a portion of the first touch electrode 210 (the first sub-electrode 211) as well as a portion of the second touch electrode 220 at the edge of the touch region 101 extends toward the non-touch region 102 to facilitate better electrical connection with the overlap electrode 315. As can be seen from FIG. 3C, the overlap electrode 315 covers a portion of the first sub-electrode 211 that extends to the non-touch region 102.

The overlap electrodes 315 are provided to facilitate the electrical connection between the first touch electrode 210 and the metal trace 310 and the electrical connection between the second touch electrode 220 and the metal trace 310. It should be noted that, the overlap electrodes 315 as illustrated in FIG. 3A are only schematic, and the shape and size of each of the overlap electrodes do not represent real proportions. For example, a width of each of the overlap electrodes 315 may be greater than the width of the remaining portion of the metal trace 310; for another example, each of the overlap electrodes 315 may have a same wide as the remaining portion of the metal trace 310.

In the embodiments of the present disclosure, the first conductive trace 230 may serve as a buffer layer of the metal trace 310 formed thereon, such that the adhesion of the metal trace 310 to the film base 100 can be increased, thereby ensuring the function of the edge bend region of the touch control structure.

For example, as illustrated in FIG. 4A and FIG. 4B (FIG. 4B is a section schematic diagram taken along line C-C' of FIG. 4A), an example of forming the laminated structure further includes the following operation.

Step S303: forming a first insulating layer 410 on the film base 100.

For example, as illustrated in FIG. 4A, the first insulating layer 410 covers both the plurality of first touch electrodes 210 and the plurality of second touch electrodes 220, and a plurality of vias 411 are formed in the first insulating layer 410 to expose the plurality of first sub-electrodes 211. For example, a material of the first insulating layer 410 may be a photoresist material, and an example of forming the first insulating layer 410 may include processes of coating photoresist, exposure, development, and the like.

For example, the first insulating layer 410 covers the entire touch region 101, and the first insulating layer 410 insulates the first touch electrode 210 from the second touch electrode 220 adjacent to the first touch electrode 210. The via 411 is arranged such that a subsequently formed bridge electrode may electrically connect two adjacent first sub-electrodes 211 to each other through the via 411.

For example, as illustrated in FIG. 5A, an example of forming the laminated structure further includes the following operation.

Step S304: forming a second conductive layer on the film base 100 by using a patterning process.

For example, as illustrated in FIG. 5A, the second conductive layer includes a plurality of bridge electrodes 511 disposed in the touch region 101 and a plurality of second conductive traces 512 disposed in the non-touch region 102.

For example, an example of forming the second conductive layer may include processes of sputtering a film, coating photoresist, exposure, development, etching, lift-off and the like.

For example, as illustrated in FIG. 5D (FIG. 5D is a section schematic diagram taken along line F-F of FIG. 5A), each of the bridge electrodes 511 covers two vias 411, the bridge electrode 511 is in direct contact with the first sub-electrodes 211 through the vias 411, and two adjacent first sub-electrodes 211 are electrically connected by the bridge electrode 511.

For example, as illustrated in FIG. 5B and FIG. 5C (FIG. 5B is a section schematic diagram taken along line D-D' of FIG. 5A, and FIG. 5C is a section schematic diagram taken along line E-E' of FIG. 5A), the plurality of second conductive trace 512 are formed on the plurality of metal traces 310 (including the overlap electrodes 315) and cover the plurality of metal traces 310.

The second conductive trace 512 may be used as a protective layer of the metal traces 310 to prevent the metal trace 310 from being directly exposed to the air, thereby avoiding an oxidation problem of the metal trace 310.

For example, as illustrated in FIG. 6A, an example of forming the laminated structure further includes the following operation.

Step S305: forming a second insulating layer 420 on the film base 100 on which the second conductive layer is formed.

For example, as illustrated in FIG. 6A and FIG. 6B (FIG. 6B is a section schematic diagram taken along line G-G' of FIG. 6A), the second insulating layer 420 covers the entire touch region 101 of the film base 100. The second insulating layer 420 covers the bridge electrodes 511 and is used to protect the bridge electrodes 511.

For example, a material of the second insulating layer 420 may be a photoresist material, and an example of forming the second insulating layer 420 may include processes of coating photoresist, exposure, development, and the like.

For example, another example of forming the laminated structure is provided, and the present example is different from the previous example in that the steps of manufacturing the first insulating layer, the second conductive layer, and the second insulating layer are different.

In the present example, forming the laminated structure includes the following operation in addition to the steps S310 and S320.

Step S303': forming a first insulating layer 410 on the film base 100.

For example, as illustrated in FIG. 7A, FIG. 7B and FIG. 7C (FIG. 7B is a section schematic diagram taken along line H-H' of FIG. 7A, and FIG. 7C is a section schematic diagram taken along line I-I' of FIG. 7A), the first insulating layer formed by the present example is different from that in the previous example in that: the formed first insulating layer 410 further covers other portion of each metal trace 310, except for the portion of each metal trace 310 in a bonding region 105. For example, the first insulating layer 410 covers the touch region 101, and the first insulating layer 410 further covers other portions of the non-touch region 102 except for the bonding region 105. Because the metal traces 310 in the bonding region 105 are to be electrically connected with other structures (for example, the metal traces 310 are electrically connected with a touch detection chip), the first insulating layer 410 does not cover the metal traces 31 in the bonding region 105. The arrangement of the vias 411 in the first insulating layer 410 may be referenced to the corresponding description of the previous example, and details are not described herein again.

In the present example, the first insulating layer 410 may be used as a protective layer of the metal traces 310 (excluding the metal traces in the bonding region), so as to prevent the metal traces 310 from being directly exposed to the air, thereby avoiding the oxidation problem of the metal traces 310.

For example, the method for manufacturing the laminated structure provided by the example further includes the following operation.

Step S304': forming a second conductive layer on the film base 100 by using a patterning process.

For example, as illustrated in FIG. 8A, the second conductive layer includes a plurality of bridge electrodes 511 disposed in the touch region 101. Each of the bridge electrodes 511 covers two vias, and two adjacent first sub-electrodes are connected with each other by the bridge electrode. The structure of the bridge electrodes is consistent with the previous example and may be referenced to FIG. 5D, details are not described herein again.

For example, as illustrated in FIG. 8A and FIG. 8B (FIG. 8B is a section schematic diagram taken along line J-J' of FIG. 8A), the present example differs from the previous example in that the second conductive layer further includes a plurality of bonding electrodes 515 covering portions of each of the plurality of metal traces 310 in the bonding region 105.

In the present example, the bonding electrodes 515 covers the metal traces 310 located in the bonding region 105, which can prevent the portion of the metal traces from being directly exposed to the air, thereby avoiding the oxidation problem of the metal traces 310.

For example, the method for manufacturing the laminated structure provided by the example further includes the following operation.

Step S305': forming a second insulating layer 420 on the film base 100 on which the second conductive layer is formed.

For example, as illustrated in FIG. 9A, FIG. 9B and FIG. 9C (FIG. 9B is a section schematic diagram taken along line K-K' of FIG. 9A, and FIG. 9C is a section schematic diagram taken along line L-L' of FIG. 9A), the present example differs from the previous example in that the second insulating layer 420 covers other regions of the film base except for the bonding region 105. For example, in the touch region 101, the second insulating layer 420 covers the bridge electrodes 511 to protect the bridge electrodes 511, which may referenced to FIG. 6B, It should be noted that, because the metal traces 310 in the bonding region 105 are to be electrically connected with other structures (for example, the metal traces 310 are electrically connected with a touch detection chip), the second insulating layer 420 does not cover the metal traces in the bonding region 105.

In summary, the touch control structure, the display device and the method for manufacturing the touch control structure provided by the embodiments of the present disclosure have at least one of the following beneficial effects.

(1) In at least one embodiment, the functional layers of the touch control structure are disposed on the same side of the film base, and the functional layers are subjected to the same stress when being bent, thereby reducing a risk of fracture.

(2) In at least one embodiment, after the film base is attached to the surface of the base substrate, other processing operations are performed on the film base to form the touch control structure. In this way, the base substrate may be used to maintain a flatness of the surface of the film base which can achieve high-precision processes.

(3) In at least one embodiment, the first conductive trace serves as a buffer layer of the metal trace formed thereon, and an adhesion of the metal trace to the film base can be increased, thereby ensuring the function of the edge bend region of the touch control structure.

(4) In at least one embodiment, the second conductive trace is used as a protective layer of the metal trace to prevent the metal trace from being directly exposed to the air, thereby avoiding an oxidation problem of the metal trace.

(5) In at least one embodiment, the first insulating layer is used as a protective layer of the metal traces (excluding the metal traces in the bonding region), so as to prevent the metal traces from being directly exposed to the air, thereby avoiding the oxidation problem of the metal traces.

(6) In at least one embodiment, the second insulating layer serves as a protective layer of the bridge electrodes to protect the bridge electrodes.

(7) In at least one embodiment, the bonding electrodes covers the metal traces located in the bonding region, which can prevent the portion of the metal traces from being directly exposed to the air, thereby avoiding the oxidation problem of the metal traces.

(8) In at least one embodiment, the base substrate (for example, a glass substrate) can be recycled after the film adhering process and film peeling process, so loss can be reduced.

What is described above are specific implementations of the disclosure, but the scopes of the disclosure are not limited to the above-mentioned implementations, and the scopes of the disclosure are defined by the accompanying claims.

What is claimed is:

1. A method for manufacturing a touch control structure, the touch control structure having a touch region and a non-touch region, the method comprising:
    proving a film base;
    providing a base substrate;
    forming a first conductive layer on the film base to cover the film base;
    attaching the film base on which the first conductive layer is formed thereon to the base substrate;
    forming a laminated structure on the film base, the laminated structure being configured for implementing a touch control function; and
    removing the film base on which the laminated structure is formed from the base substrate,
    wherein the forming the laminated structure comprises:
    performing a patterning process on the first conductive layer to form a plurality of electrode patterns, wherein the plurality of electrode patterns comprises a plurality of first touch electrodes disposed in the touch region, a plurality of second touch electrodes disposed in the touch region, and a plurality of first conductive traces disposed in the non-touch region, and each of the first touch electrodes comprises a plurality of first sub-electrodes; and
    forming a plurality of metal traces on the plurality of first conductive traces, the plurality of metal traces being located in the non-touch region,
    wherein each of plurality of first conductive traces is between the film base and one of the plurality of metal traces and is in contact with both the film base and the one of the plurality of metal traces.

2. The method according to claim 1, further comprising:
    after attaching the film base to the base substrate, forming an alignment mark on the first conductive layer, the alignment mark being configured for implementing an alignment function.

3. The method according to claim 1, wherein
    each of the plurality of metal traces comprises an overlap electrode adjacent to an edge of the touch region, and the plurality of first touch electrodes and the plurality of second touch electrodes are correspondingly connected with the plurality of metal traces through a plurality of the overlap electrodes.

4. The method according to claim 3, wherein the forming the laminated structure further comprises:
    forming a first insulating layer on the film base,
    wherein the first insulating layer covers both the plurality of first touch electrodes and the plurality of second touch electrodes, and a plurality of vias are formed in the first insulating layer to expose the plurality of first sub-electrodes.

5. The method according to claim 4, wherein the forming the laminated structure further comprises:
    forming a second conductive layer on the film base by using a patterning process,
    wherein the second conductive layer comprises a plurality of bridge electrodes disposed in the touch region and a plurality of second conductive traces disposed in the non-touch region,
    each of the bridge electrodes covers two of the vias, two adjacent first sub-electrodes are connected with each other by one of the bridge electrodes, and
    the plurality of second conductive traces are formed on the plurality of metal traces and cover the plurality of metal traces.

6. The method according to claim 5, wherein the forming the laminated structure further comprises:
    forming a second insulating layer on the film base on which the second conductive layer is formed,
    wherein the second insulating layer covers an entirety of the touch region.

7. The method according to claim 4, wherein the first insulating layer further covers each of the plurality of metal traces, except for a portion of each of the plurality of metal traces in a bonding region.

8. The method according to claim 7, wherein the forming the laminated structure further comprises:
    forming a second conductive layer on the film base by using a patterning process,
    wherein the second conductive layer comprises a plurality of bridge electrodes disposed in the touch region and a plurality of bonding electrodes disposed in the non-touch region,
    each of the bridge electrodes covers two of the vias, two adjacent first sub-electrodes are connected with each other by one of the bridge electrodes, and the plurality of bonding electrodes cover a portion of each of the plurality of metal traces located in the bonding region.

9. The method according to claim 8, wherein the forming the laminated structure further comprises:

forming a second insulating layer on the film base on which the second conductive layer is formed, wherein the second insulating layer covers the film base, except the bonding region.

\* \* \* \* \*

UNITED STATES PATENT AND TRADEMARK OFFICE
CERTIFICATE OF CORRECTION

| | | |
|---|---|---|
| PATENT NO. | : 10,895,944 B2 | Page 1 of 1 |
| APPLICATION NO. | : 16/339480 | |
| DATED | : January 19, 2021 | |
| INVENTOR(S) | : Wang et al. | |

It is certified that error appears in the above-identified patent and that said Letters Patent is hereby corrected as shown below:

On the Title Page

Item (73) Assignees, Column 1, Line 2:
After Hefei Xinsheng Optoelectronics Technology Co., Ltd., delete "Anhui (CN)" and insert --Hefei (CN)--

Signed and Sealed this
Ninth Day of March, 2021

Drew Hirshfeld
*Performing the Functions and Duties of the
Under Secretary of Commerce for Intellectual Property and
Director of the United States Patent and Trademark Office*